United States Patent
Yang et al.

(10) Patent No.: US 9,205,844 B2
(45) Date of Patent: Dec. 8, 2015

(54) DRIVER DROWSINESS DETECTION

(71) Applicant: Ford Global Technologies, LLC, Dearborn, MI (US)

(72) Inventors: Hsin-hsiang Yang, Ann Arbor, MI (US); Kwaku O. Prakah-Asante, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 163 days.

(21) Appl. No.: 14/197,534

(22) Filed: Mar. 5, 2014

(65) Prior Publication Data

US 2015/0251663 A1    Sep. 10, 2015

(51) Int. Cl.
*B60W 40/114*   (2012.01)
*G08B 21/06*   (2006.01)

(52) U.S. Cl.
CPC ............ *B60W 40/114* (2013.01); *G08B 21/06* (2013.01)

(58) Field of Classification Search
CPC .............................. B60W 40/114; G08B 21/06
USPC ........................................................ 701/36
See application file for complete search history.

(56) References Cited

U.S. PATENT DOCUMENTS

| | | | |
|---|---|---|---|
| 4,594,583 A | 6/1986 | Seko et al. | |
| 7,639,148 B2 | 12/2009 | Victor | |
| 8,260,491 B2 | 9/2012 | Brighenti et al. | |
| 8,519,853 B2 | 8/2013 | Eskandarian et al. | |
| 9,139,087 B2 * | 9/2015 | Tuzsuzov | B60K 28/066 |
| 2013/0113910 A1 | 5/2013 | Kim | |

OTHER PUBLICATIONS

Ronald R. Knipling, et al., "Vehicle-Based Drowsy Driver Detection: Current Status and Future Prospects", aper Delivered at the IVHS America Fourth Annual Meeting, Atlanta, GA, Apr. 17-20, 1994, 23 pages.

* cited by examiner

*Primary Examiner* — Richard Camby
(74) *Attorney, Agent, or Firm* — Frank A. MacKenzie; Bejin Bieneman PLC (57) ABSTRACT

Data is collected related to a yaw-rate of a vehicle during a period of time. Based in part on the yaw-rate data, an actual trajectory and an ideal trajectory for the vehicle in the period of time are computed. A deviation of a yaw-rate associated with the actual trajectory is determined from a yaw-rate associated with the ideal trajectory. A variance of the deviation is calculated. An indication is provided of a dangerous driving condition if the variance exceeds a predetermined variance threshold.

20 Claims, 8 Drawing Sheets

DRIVER DROWSINESS DETECTION

BACKGROUND

Driver drowsiness poses risks to traffic safety. Various mechanisms have been previously used to attempt to detect driver drowsiness. For example, cameras in an interior of a vehicle may be used to monitor a driver's eyes, whereupon a percentage of time the driver's eyes are closed may be determined. When a driver's eyes are closed for a percentage of time in a given period of time higher than a predetermined threshold, driver drowsiness may be determined. However, use of interior cameras to monitor a driver's eyes may be unreliable, and moreover, increases vehicle cost, and manufacturing complexity by requiring an in-cabin sensor that otherwise would not be required to be included in a vehicle.

Another current mechanism for attempting to detect driver drowsiness includes using cameras external to a vehicle to determine whether a driving pattern is inconsistent with road conditions, e.g., whether a driver is veering in and out of a lane. However, exterior cameras needed to obtain information about a road may not be reliable, particularly when road conditions are poor, weather is severe, etc. Further, as with use of interior cameras, using exterior cameras and/or other types of sensors to determine a vehicle's position with respect to a roadway can add costs, weight, and manufacturing complexity to a vehicle.

In short, present mechanisms for detecting driver drowsiness may suffer from shortcomings, e.g., related to unreliability, especially needed sensors, etc.

DETAILED DESCRIPTION

System Overview

Figure 1:
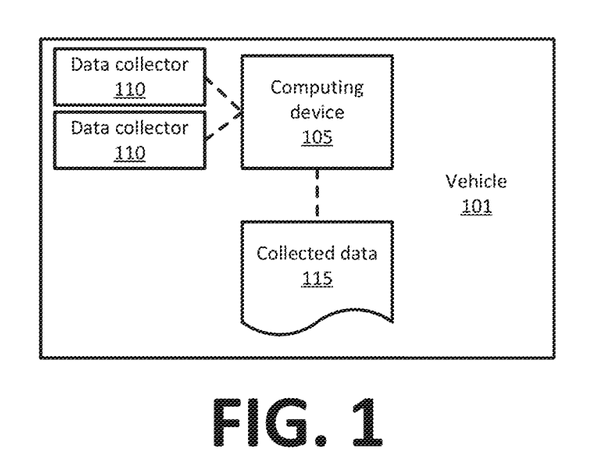
FIG. 1 is a block diagram of a vehicle system for detecting driver drowsiness.

FIG. 1 is a block diagram of a vehicle 101 system for detecting driver drowsiness. The vehicle 101 includes a computing device 105 that is communicatively coupled to one or more data collectors 110, e.g., sensors or the like such as are known for collecting data 115 relating to a yaw rate of the vehicle 101 and/or other data as discussed herein. The computer 105 is further configured to use yaw data 115.

Mechanisms for determining a driver drowsiness condition are described in more detail below; in general, data 115 can be used to reconstruct a vehicle's recent trajectory on a road, and can be compared to an ideal trajectory computed according to a known driver reference model, such as the MacAdam model. Comparing actual driver behavior to an emulation resulting from a driver model eliminates or reduces the extent to which road conditions, e.g., curves, bumps, etc., have caused driver behavior, e.g., manifested in yaw-rates, that otherwise would be interpreted as stemming from drowsiness. A specific frequency component of yaw-rate related to drowsiness may be identified, and assessed to identify a driving pattern associated with drowsiness.

The computer 105 may further be configured to take action, e.g., provide an alert or the like and/or execute some control of the vehicle 101, e.g., slowing or stopping the vehicle 101, upon a determination that driver drowsiness has been detected. Accordingly, driver drowsiness may be quantified and identified without using sensors other than yaw-rate data collectors 110 generally already disposed in a vehicle 101, and without additional road information that would require additional data 115 and/or sensors 110.

Exemplary System Elements

The vehicle 101 is generally a lan-based vehicle traveling on two or more wheels, e.g., a passenger automobile or the like. A central computer 105, e.g., included in the vehicle 101, generally includes a processor and a memory, the memory including one or more forms of computer-readable media, generally including volatile and non-volatile memory, and storing instructions executable by the processor for performing various operations, including as disclosed herein. The memory of the computer 105 further generally stores instructions, executable by the processor of the computer 105, for carrying out processes disclosed herein, e.g., receiving and evaluating data 115 from data collectors 110, making determinations with respect to driver drowsiness, etc.

The computer 105 is generally configured for communications on a controller area network (CAN) bus or the like. In addition, the computer 105 may be configured for communicating with one or more devices 150, e.g., via various wired and/or wireless networking technologies, such as Bluetooth, a universal serial bus (USB) or micro-USB cable, etc. Further, the computer 105 may include, or may be coupled to, a human machine interface (HMI), that's may receive input provided to the computer 105, and display output. An HMI may include a variety of mechanisms, e.g., an input device such as a touchscreen, keyboard, keypad, microphone, etc., and further generally includes output mechanisms such as a display screen, speakers, etc.

Data collectors 110 may include a variety of devices, including sensors or the like, e.g., using gyroscopes, generally deployed in existing vehicles 101 for detecting a yaw rate and/or other data 115. Further, various controllers in a vehicle may operate as data collectors 110 to provide data 115 via the CAN bus, e.g., data 115 relating to vehicle speed, acceleration, etc. Yet further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms to detect a position, change in position, rate of change in position, etc., of vehicle 101 components such as a steering wheel, brake pedal, accelerator, gearshift lever, etc.

A memory of the computer 105 generally stores collected data 115. Collected data 115 may include a variety of data collected in a vehicle 101. Examples of collected data 115 are provided above, and moreover, data 115 is generally collected using one or more data collectors 110, and may additionally include data calculated therefrom in the computer 105.

Exemplary Process Flows

Figure 2:
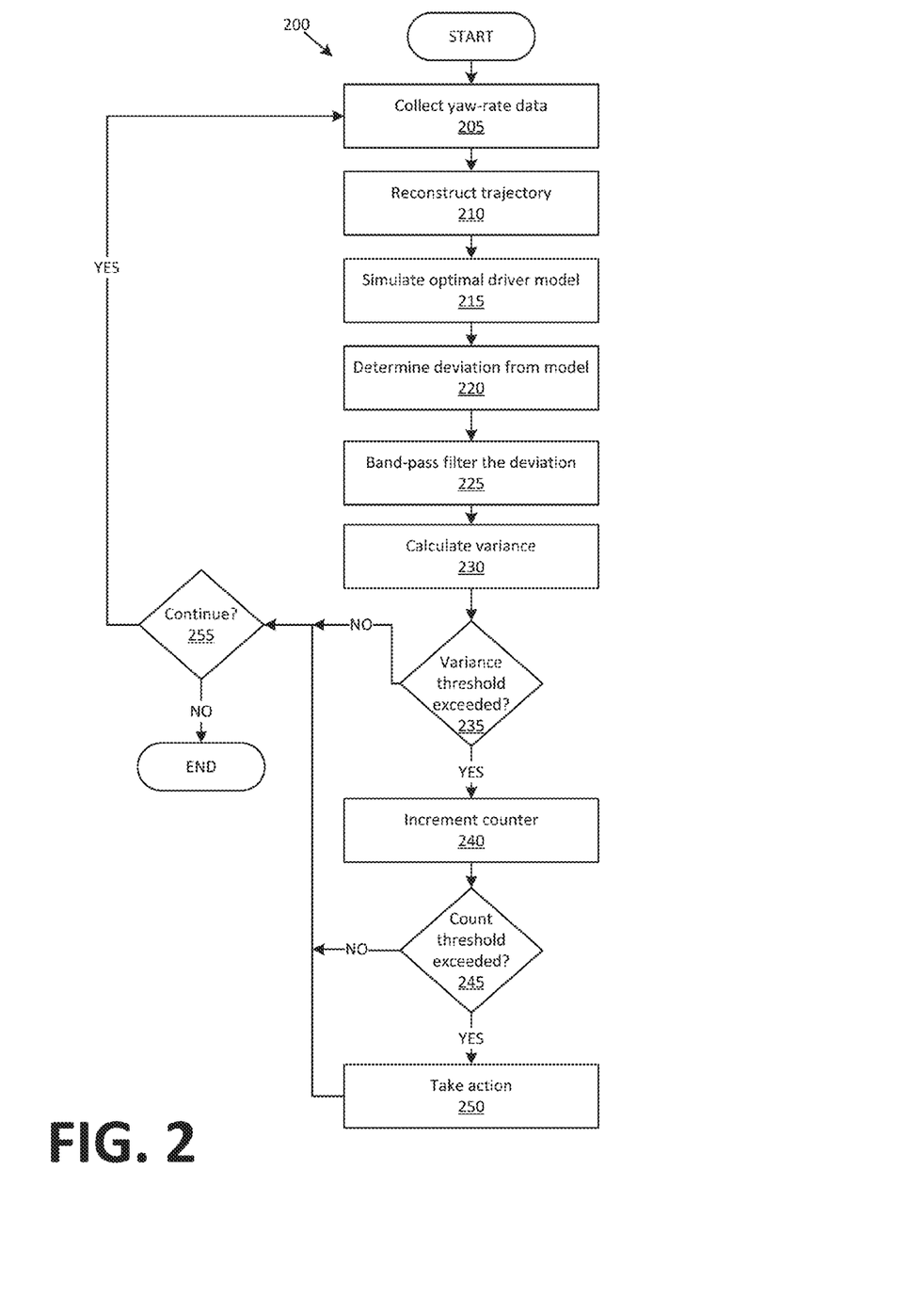
FIG. 2 is a diagram of an exemplary process for detecting driver drowsiness.

FIG. 2 is a diagram of an exemplary process 200 for detecting driver drowsiness. The process 200 begins in a block 205, in which a vehicle 101 computer 105 collects data 115 including a yaw-rate of the vehicle 101 for a period of time, e.g., the past 10 seconds, the past 20 seconds, the past 30 seconds, etc.

Figure 3:
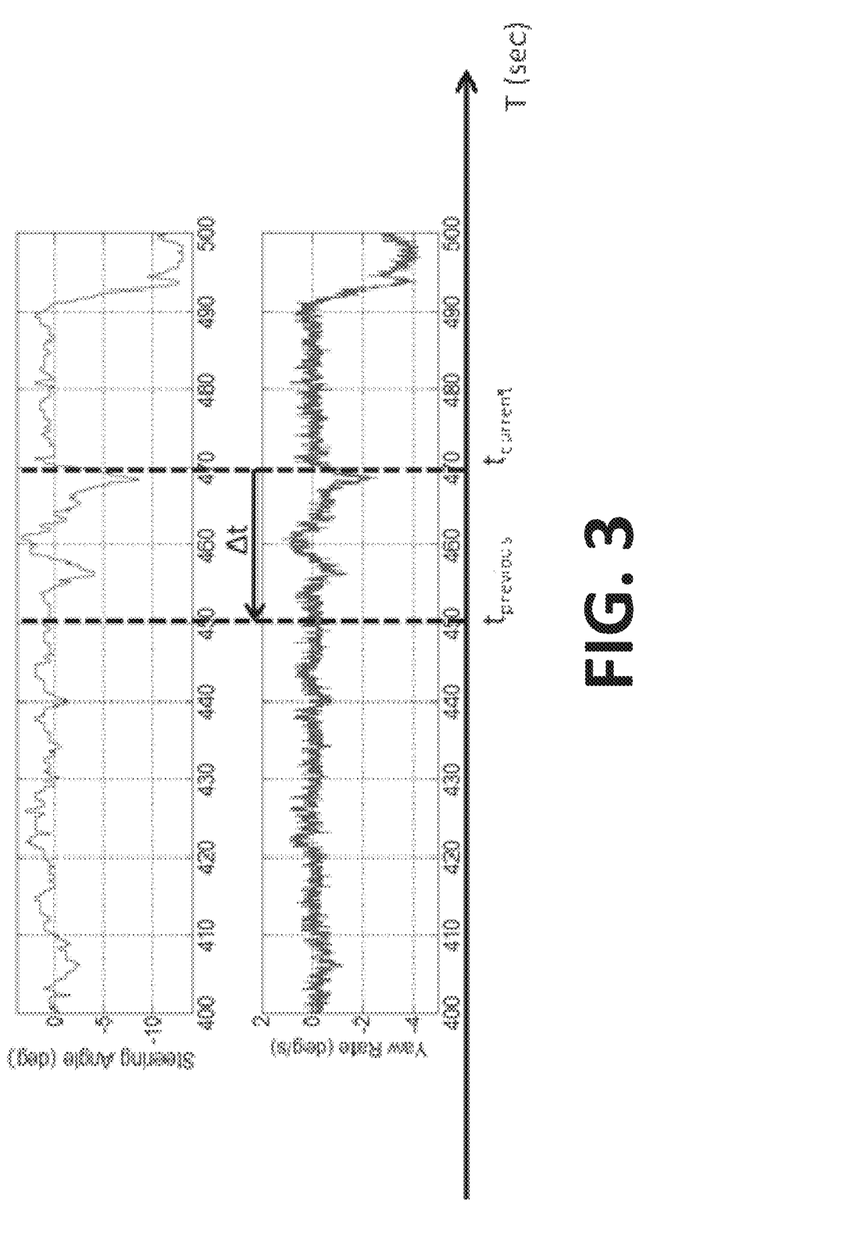
FIG. 3 illustrates exemplary graphs of vehicle data including yaw-rate data, that may be used to reconstruct a vehicle trajectory.

Next, in a block 210, the computer 105 reconstructs a trajectory of the vehicle 101 for the period of time. This reconstruction is performed by integrating the vehicle 101 yaw-rate over the time period to obtain a vehicle heading angle, i.e., a yaw. FIG. 3 illustrates an example of vehicle 101 data 115, including yaw-rate data 115, that may be used to reconstruct a vehicle trajectory. Note that a yaw-rate measured from a vehicle 101 sensor 110 generally will include noise and bias. Such measurement errors, in particular the bias, may contaminate accuracy of a computation of vehicle 101 heading angle. However, because in the present application, the integration interval, i.e., $\Delta t$, is of relatively short duration, aggregate bias may be ignored. Equation 1 illustrates a calculation of the vehicle heading angle $\Psi(t)$ given a yaw rate r at a time t.

$$\Psi(t) = \int_{t_{current}-\Delta t}^{t} r(t) dt, t_{current} - \Delta t \leq t \leq t_{current} \quad \text{Equation 1}$$

Then, based on a further assumption of no, or at least no significant, lateral velocity of vehicle 101, using data 115 identifying a vehicle 101 velocity at a time t in addition to the vehicle heading angle $\Psi(t)$ calculated in Equation 1, kinematic equations can be used to reconstruct the vehicle 101 trajectory, as illustrated by the following Equation 2.

$$\begin{cases} Position_x(t) = \int_{t_{current}-\Delta t}^{t} v(t) \cdot \cos\psi(t) dt \\ Position_y(t) = \int_{t_{current}-\Delta t}^{t} v(t) \cdot \sin\psi(t) dt \end{cases} \quad t_{current} - \Delta t \leq t \leq t_{current}$$

Equations 2a and 2b

Figure 4:
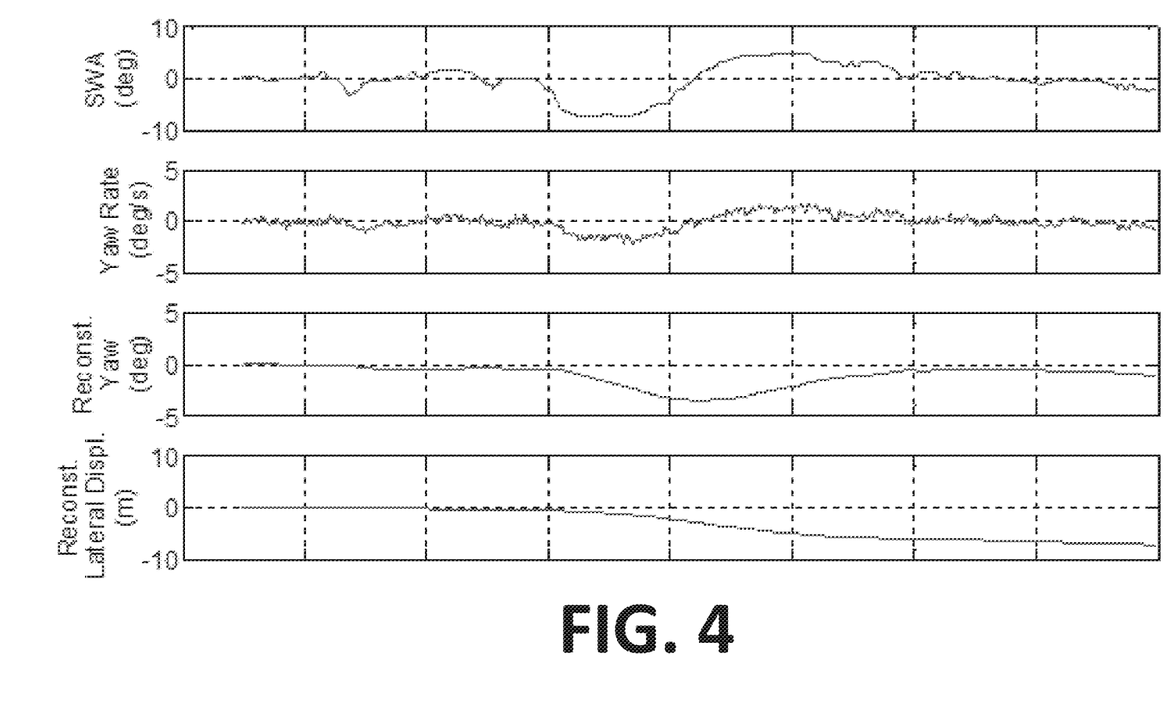
FIG. 4 illustrates exemplary graphs of vehicle lane change trajectory reconstruction.

FIG. 4 illustrates exemplary graphs of vehicle lane change trajectory reconstruction. That is, a reconstructed trajectory representing a maneuver or maneuvers executed during the interval $\Delta t$, is provided.

Next, in a block 215, a driver reference model is used to calculate optimal steering angle, and to generate an optimal vehicle 101 execution of the reconstructed could directory of the block 210. (In general, a driver reference model, as is known, may be used to determine optimal driver behaviors, such as optimal steering angles, optimal speeds, etc.) The reconstructed trajectory by itself is not necessarily useful to provide a reliable indicator of driver drowsiness. This is because information relating to a road being traveled by the vehicle 101 during the interval $\Delta t$ generally should also be considered. For example, vehicle 101 turns or lateral movements may be interpreted differently where a road is relatively straight, as opposed to where a road is relatively curved or winding. Accordingly, a driver model is used to reflect an optimal or ideal set of vehicle 101 heading angles for executing the reconstructed trajectory. In one implementation, the MacAdam driver model is used as shown in Equation 3.

$$u_{opt} = \frac{\int_0^T [y_d(t) - F(t)x_0]g(t) dt}{\int_0^T g(t)^2 dt} \quad \text{Equation 3}$$

Driver models including the MacAdam model are generally known for calculating an optimal vehicle 101 heading or steering angle $u_{opt}$, as shown in in Equation 3. That is, $y_d(t)$ represents a desired path such as, it will be apparent, may be derived from Equation 2. The variable $x_0$ represents an initial condition of the vehicle 101. Matrices F(t) and g(t) are state transition vehicle 101 system matrixes and state transition vehicle 101 input matrixes, respectively. T represents a preview horizon.

Figure 5A:
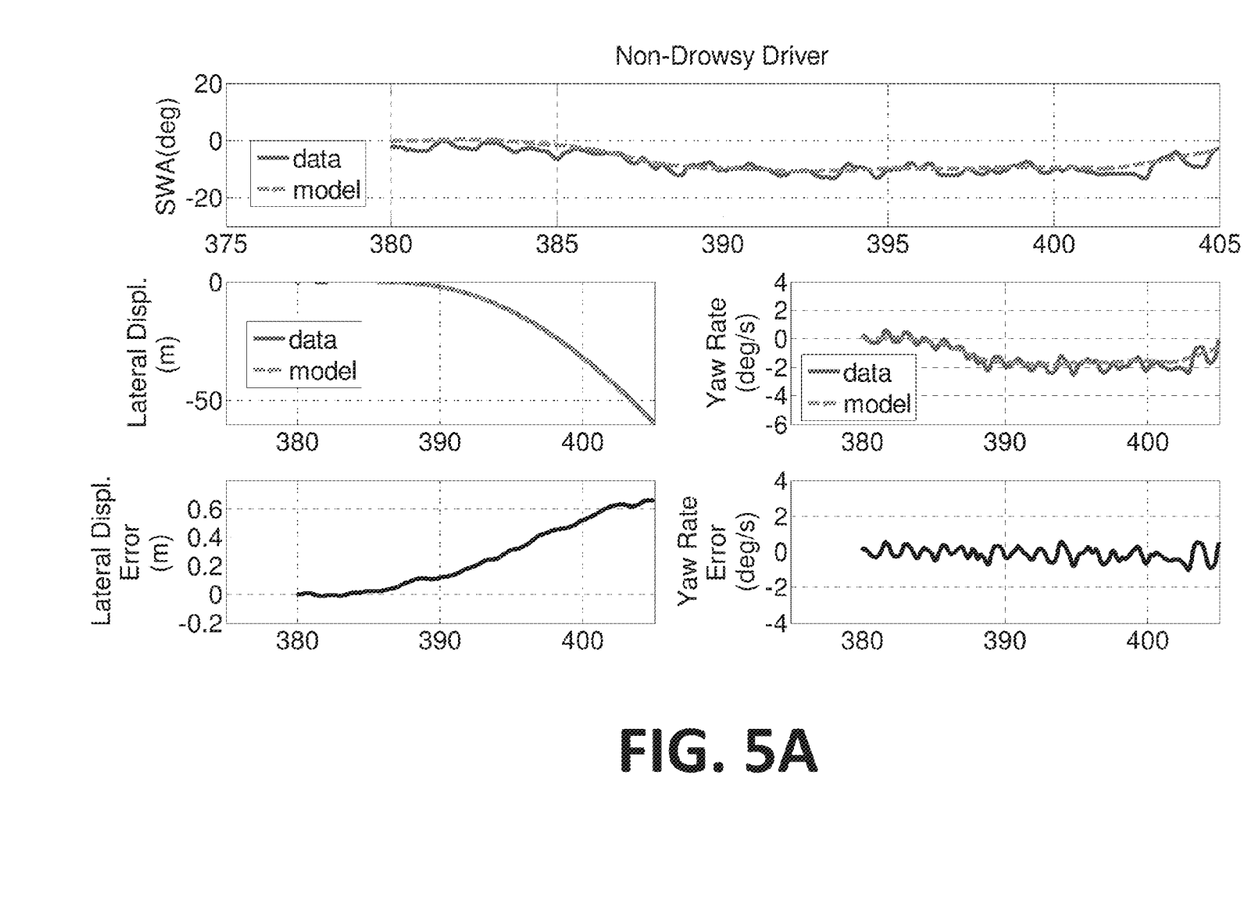
FIGS. 5A and 5B illustrate exemplary graphs of simulations from a trajectory determined by a driver model and from human driver behaviors, respectively.
Figure 5B:
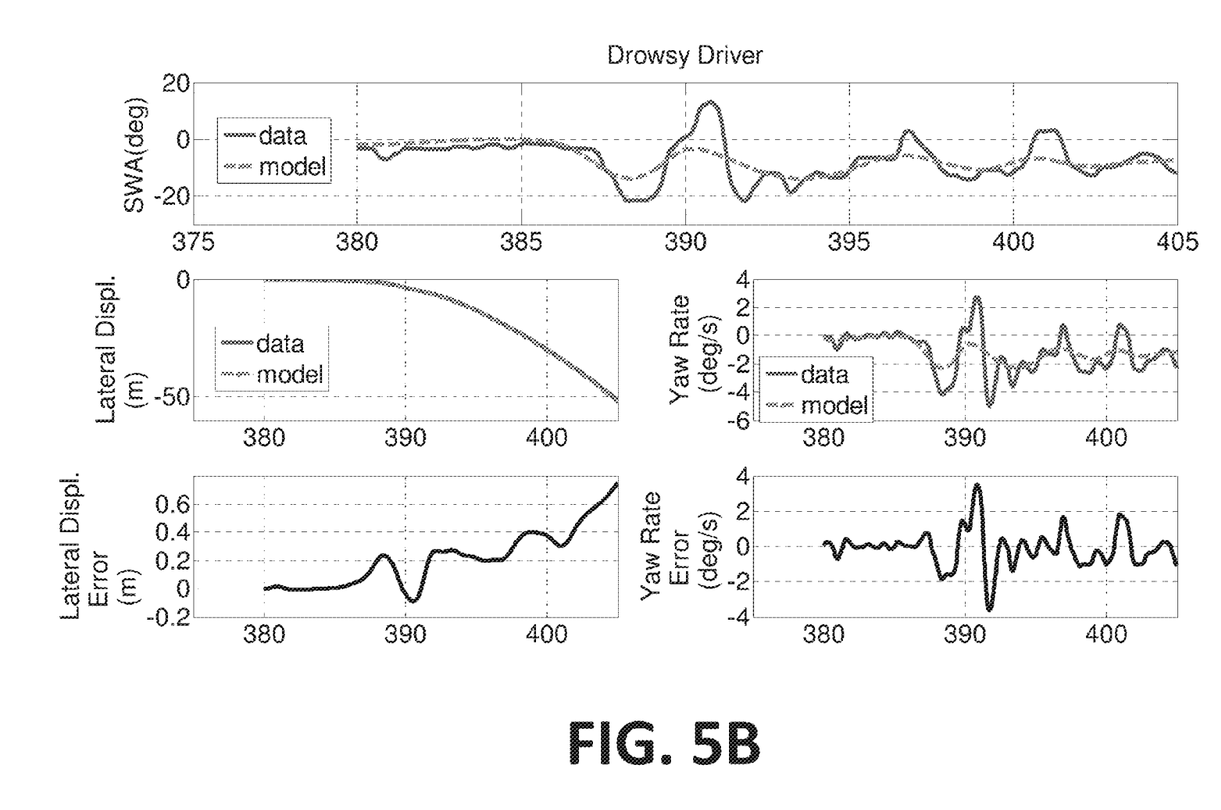

FIGS. 5A and 5B respectively show simulations from a trajectory determined by a driver model and from human driver behaviors. An optimal, non-drowsy driver (FIG. 5A) may operate a vehicle 101 in a manner close to that indicated by optimal preview model (e.g., Equation 3), i.e., with small yaw-rate variations. A drowsy driver (FIG. 5B), on the other hand, shows excessive steering behavior compared to the reference model, and large yaw-rate variations, indicating driver drowsiness.

Following the block 215, in a block 220, the computer 105 determines respective deviations from an ideal yaw-rate for a set of yaw-rates measured at respective times t. This determination is generally made by comparing actual steering behavior reflected in yaw-rate data 115 with ideal steering behavior as indicated by the reference driver model.

Figure 6A:
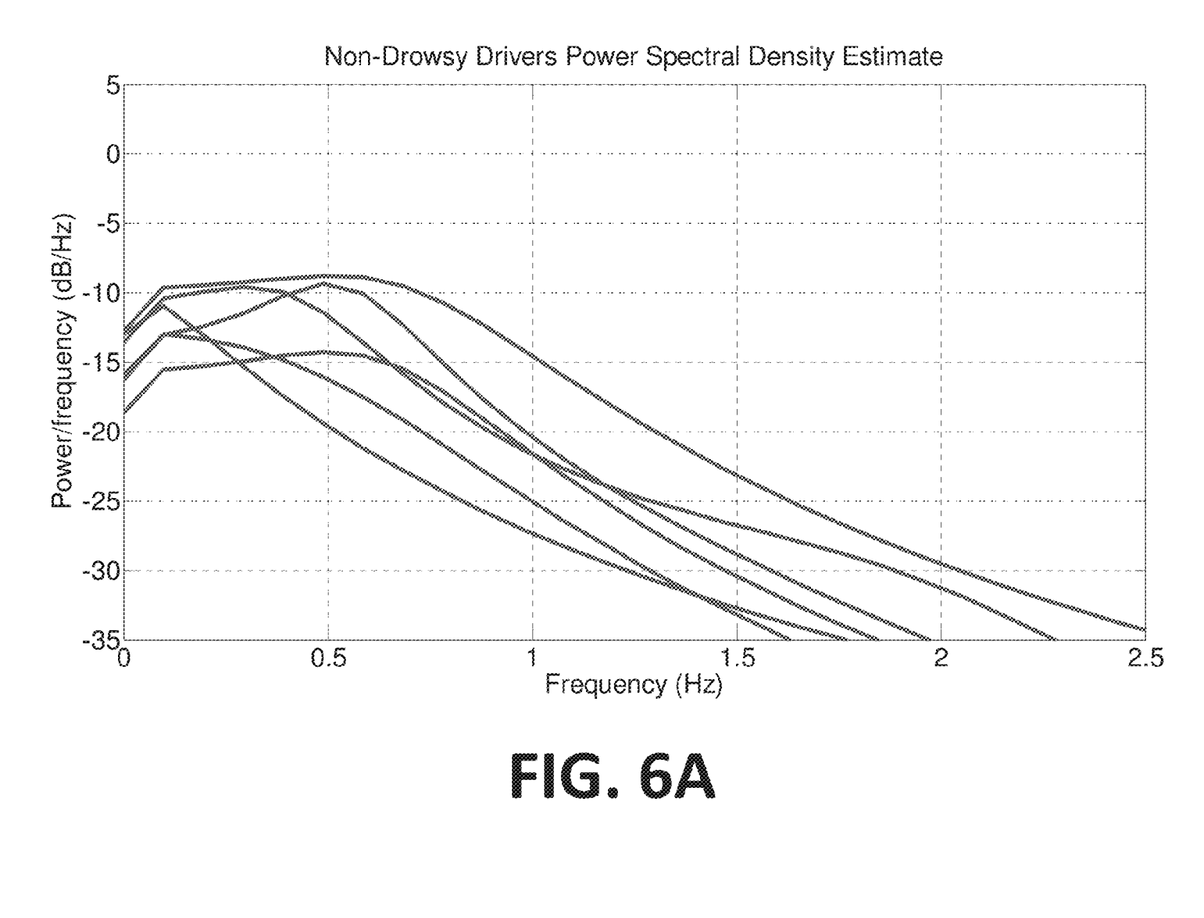
FIGS. 6A and 6B illustrate exemplary graphs of a power spectral density analysis of yaw-rate data for a non-drowsy driver and a drowsy driver, respectively.
Figure 6B:
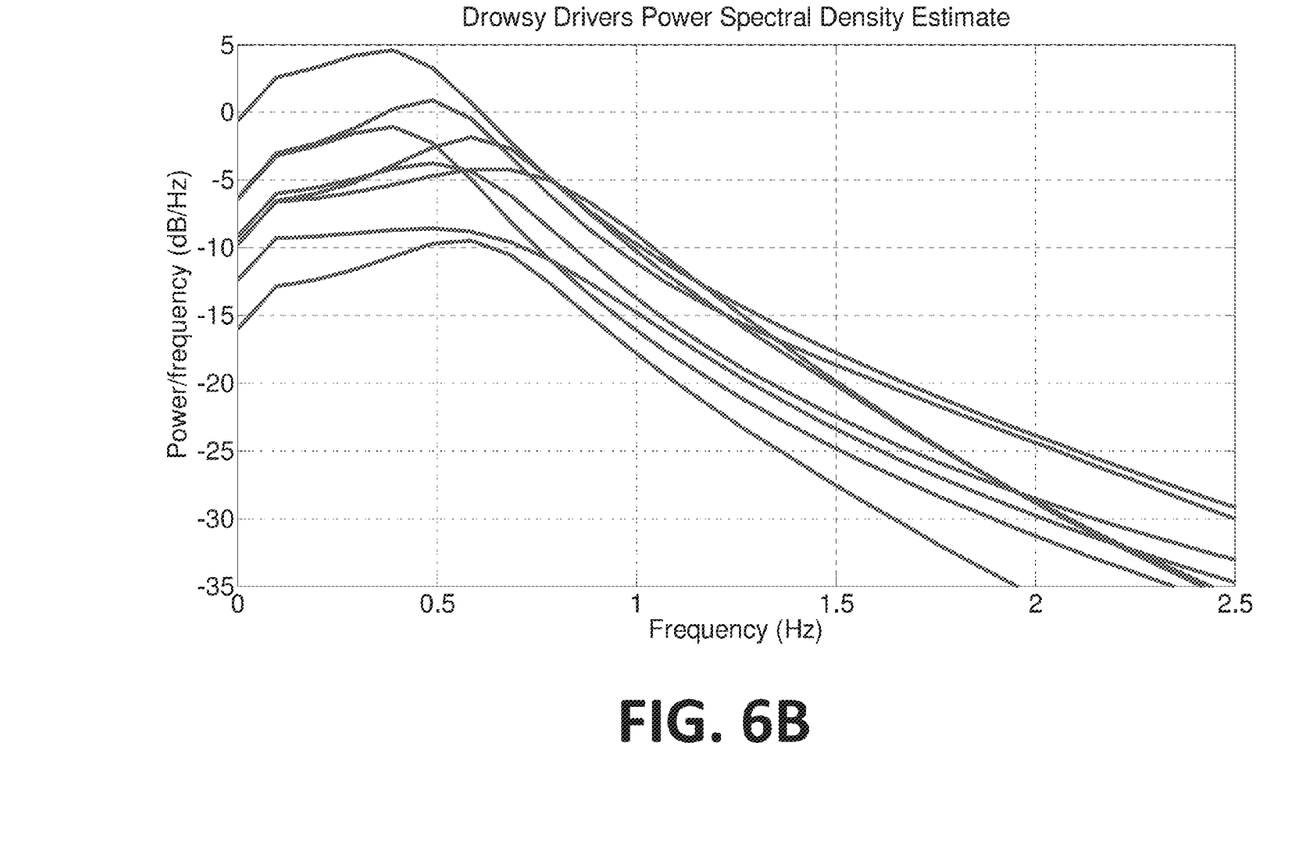

Next, in a block 225, the computer 105 applies a ban-pass filter to the yaw-rate deviations from ideal determined as described with respect to the block 215. The ban-pass filter is desirable because empirically determined behaviors of drowsy drivers are reflected by yaw-rate measurements having significant frequency components. Power spectral density analyses illustrate the effects of the drowsiness on yaw-rate data 115. For example, FIG. 6A provides an exemplary graph of a power spectral density analysis of yaw-rate deviations for a non-drowsy driver, and FIG. 6B provides an exemplary graphical power spectral density analysis of yaw-rate deviations from the ideal determined by a reference model for a drowsy driver. As can be seen, for the represented data shown, drowsy drivers' behaviors may be most significant around 0.2-0.75 hertz, i.e., deviations from behaviors of non-drowsy drivers are most noticeable. In any event, Equation 4 illustrates high and low ban-pass filters, such as are generally known that may generally be used to isolate data 115 likely related to drowsy behaviors.

$$\begin{cases} y_i = \alpha_{lp} \cdot y_{i-1} + (1 - \alpha_{lp})x_i \\ y'_i = \alpha_{hp} \cdot y'_{i-1} + \alpha_{hp}(y_i - y_{i-1}) \end{cases} \quad \text{Equation 4a and 4b}$$

That is, Equation 4a illustrates a low-pass filter, with input x (yaw-rate deviation), low-pass filter time constant $a_{lp}$, and low-passed output y. Equation 4b in turn illustrates a high-pass filter using the output y from Equation 4a, high-pass filter time constant $a_{hp}$, high-passed output y'.

Next, in a block 230, the computer 105 calculates a variance for the high-pass output y' determined as described above with respect to the block 225. For example, with respect to Equation 5 below, a standard variance calculation may be performed for n instances of y' given an average value $\mu$ of y'.

$$\text{var} = \frac{1}{n} \sum_{i=1}^{n} (y'_i - \mu)^2 \quad \text{Equation 5}$$

Next, in a block 235, the computer 105 determines whether the variance calculated in the block 230 exceeds a predetermined threshold. The predetermined threshold is generally determined through empirical testing and a calibration dependent on a vehicle platform. If the variance does exceed the predetermined variance threshold, then a block 240 is executed next. Otherwise, the process 200 proceeds to a block 255.

In the block 240, which may follow the block 235, the computer 105 increments a counter that is an integer datatype generally initially set (or re-set) to zero, and that is used to record a number of times a variance threshold has been exceeded since the counter was set or re-set. For example, in the presently-described implementation, the counter records a number of time periods t for which the variance threshold has been exceeded. After a predetermined period of time, e.g., in one implementation, six minutes, the counter is re-set.

Following the block 240, in a block 245, the computer 105 determines whether the counter incremented in the block 240 exceeds a predetermined threshold. As with the predetermined variance threshold of the block 235, described above, the counter threshold of the block 240 may be determined by empirical testing and a calibration dependent on a vehicle platform. If the counter threshold is exceeded, then a block 250 is executed next. Otherwise, the process 200 proceeds to the block 255.

In the block 250, which may follow the block 245, the computer 105 identifies a dangerous driving condition, e.g., a drowsiness condition and generally takes an action based thereon. For example, the computer 105 could raise one or more alerts via an HMI, e.g., an audio alert providing a noise or message to the vehicle 101 driver, a visual alert on a screen of the HMI, etc. Further, the computer 105 could be configured to send instructions to one or more controllers in the vehicle 101, e.g., to adjust a speed of the vehicle 101, to steer the vehicle 101 to a safe stop, etc. Following the block 255, the process 200 proceeds to the block 255.

In the block 255, which may follow any of the blocks 235, 245, 250, the computer 105 determines whether the process 200 should continue. For example, the vehicle 101 could be powered off, stopped, or moving at a velocity insufficient for meaningful yaw-rate data to be gathered. Accordingly, the process 200 may end following the block 255. However, the process 200 may also continue by returning to the block 205. Further in the block 255, the counter discussed with respect to the block 240 may be re-set or adjusted, e.g., after a period of time as described above.

Note that presently described mechanisms could be used to identify anomalous driving conditions other than drowsiness, e.g., a driver who was impaired because of a medical condition, drugs or alcohol, etc. However, for impairments other than drowsiness, values of variables in the above analysis could be different. For example, as was explained above, a power spectral density analysis for drowsy drivers' behaviors focuses on a range around 0.2-0.75 hertz. The range could be different for other types of impaired behaviors.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a C-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer in a vehicle, the computer comprising a processor and a memory, wherein the computer is configured to:
   collect data related to a yaw-rate of the vehicle during a period of time;
   compute, based in part on the yaw-rate data, an actual trajectory and an ideal trajectory for the vehicle in the period of time;

determine a deviation of a yaw-rate associated with the actual trajectory from a yaw-rate associated with the ideal trajectory;

calculate a variance of the deviation; and provide an indication of a dangerous driving condition if the variance exceeds a predetermined variance threshold.

2. The system of claim 1, wherein the dangerous driving condition is a drowsiness condition.

3. The system of claim 1, wherein the ideal trajectory is computed in part based on velocity data for the vehicle in the period of time.

4. The system of claim 1, wherein the ideal trajectory is computed based on a reference driver model.

5. The system of claim 4, wherein the reference driver model is an optimum preview driver model.

6. The system of claim 1, wherein the computer is further configured to ban-pass filter the deviation before calculating the variance.

7. The system of claim 6, wherein the ban-pass filer is configured according to a power spectral density analysis of yaw-rate deviations.

8. The system of claim 1, wherein the computer is further configured to increment a counter if the variance exceeds the predetermined variance threshold, wherein the indication of the dangerous driving condition is provided only if the counter exceeds a predetermined counter threshold.

9. A method, comprising:
collecting data related to a yaw-rate of a vehicle during a period of time;

computing, based in part on the yaw-rate data, an actual trajectory and an ideal trajectory for the vehicle in the period of time;

determining a deviation of a yaw-rate associated with the actual trajectory from a yaw-rate associated with the ideal trajectory;

calculating a variance of the deviation; and providing an indication of a dangerous driving condition if the variance exceeds a predetermined variance threshold.

10. The method of claim 9, wherein the dangerous driving condition is a drowsiness condition.

11. The method of claim 9, wherein the ideal trajectory is computed in part based on velocity data for the vehicle in the period of time.

12. The method of claim 9, wherein the ideal trajectory is computed based on a reference driver model.

13. The method of claim 12, wherein the reference driver model is an optimum preview driver model.

14. The method of claim 9, wherein the computer is further configured to ban-pass filter the deviation before calculating the variance.

15. The method of claim 14, wherein the ban-pass filer is configured according to a power spectral density analysis of yaw-rate deviations.

16. The method of claim 9, further comprising incrementing a counter if the variance exceeds the predetermined variance threshold, wherein the indication of the dangerous driving condition is provided only if the counter exceeds a predetermined counter threshold.

17. A non-transitory computer-readable medium having instructions tangibly embodied thereon, the instructions including instructions to:
collect data related to a yaw-rate of the vehicle during a period of time;

compute, based in part on the yaw-rate data, an actual trajectory and an ideal trajectory for the vehicle in the period of time;

determine a deviation of a yaw-rate associated with the actual trajectory from a yaw-rate associated with the ideal trajectory;

calculate a variance of the deviation; and provide an indication of a dangerous driving condition if the variance exceeds a predetermined variance threshold.

18. The medium of claim 17, wherein the ideal trajectory is computed based on a reference driver model.

19. The medium of claim 17, the instructions further including instructions to ban-pass filter the deviation before calculating the variance.

20. The medium of claim 19, wherein the ban-pass filer is configured according to a power spectral density analysis of yaw-rate deviations.

* * * * *